US007271802B2

(12) United States Patent
Wang et al.

(10) Patent No.: US 7,271,802 B2
(45) Date of Patent: Sep. 18, 2007

(54) DUAL PANEL DISPLAY BACKLIGHT POWER CONTROLLER CHIP FOR HANDHELD APPARATUS

(75) Inventors: Der-Jiunn Wang, Hsinchu (TW); Jing-Meng Liu, Hsinchu (TW); Chao-Hsuan Chuang, Jhubei (TW); Nien-Hui Kung, Toufen Township, Miaoli County (TW); Wen-Hung Huang, Yangmei Township, Taoyuan County (TW)

(73) Assignee: Richtek Technology Corp., Hsinchu (TW)

( * ) Notice: Subject to any disclaimer, the term of this patent is extended or adjusted under 35 U.S.C. 154(b) by 702 days.

(21) Appl. No.: 10/846,585

(22) Filed: May 17, 2004

(65) Prior Publication Data

US 2004/0252096 A1 Dec. 16, 2004

(30) Foreign Application Priority Data

May 21, 2003 (TW) .............................. 92209354 U

(51) Int. Cl.
*G06F 1/30* (2006.01)

(52) U.S. Cl. ....................... 345/211; 345/1.1; 345/204; 345/212; 345/214; 345/690

(58) Field of Classification Search ................ 345/1.1, 345/204, 211, 212, 214, 690
See application file for complete search history.

(56) References Cited

U.S. PATENT DOCUMENTS

2003/0164445 A1* 9/2003 Turnbull ................. 250/214 C
2004/0160435 A1* 8/2004 Cui et al. ................... 345/211
2004/0217954 A1* 11/2004 O'Gorman et al. ......... 345/211

* cited by examiner

*Primary Examiner*—Bipin Shalwala
*Assistant Examiner*—Vincent E. Kovalick
(74) *Attorney, Agent, or Firm*—Rosenberg, Klein & Lee

(57) ABSTRACT

A backlight power controller chip comprises a control circuit connected to two switches to turn on and off two display panels of a dual panel display handheld apparatus. The controller chip individually switches the two switches to control the backlight sources of the two display panels. The controller chip is available for various types of display panels.

18 Claims, 5 Drawing Sheets

DUAL PANEL DISPLAY BACKLIGHT POWER CONTROLLER CHIP FOR HANDHELD APPARATUS

FIELD OF THE INVENTION

The present invention relates generally to a light source system and more particularly, to a dual panel display backlight power controller chip for handheld apparatus and light source system of a dual panel display handheld apparatus with the application of the controller chip.

BACKGROUND OF THE INVENTION

Recently, commercially available handheld apparatus, such as mobile phone and personal digital assistant (PDA) requires two display panels for providing some additional functions, such as digital camera. For a folding mobile phone having a digital camera, for example, the front secondary display panel is used for time, phone number or caller ID display, while the inner primary display panel is used for text, picture or video display. When a user is desirous of taking a photo shot on an object except for himself, the inner primary display panel is used for viewing window to monitor the lens of the digital camera for the purpose of alignment of the lens to the object, while the user is anxious for taking photo shot for himself, the lens of the digital camera can be monitored by the front secondary display panel as the viewing window.

There are many combinations for a dual panel display, so that it is hard to provide the total power solution for various power requirements. Specifically, due to different power supplies required for each of the panels, power supplies sufficient for individual panels must be provided. Two schemes are currently designed for individually turning each display panel on and off. In the first one, as illustrated in FIG. 1, an input voltage $V_{IN}$ from power source is converted to an output voltage $V_{OUT}$ by a controller chip 100 to supply to the backlight sources 104 and 108 of display panels 102 and 106 through an output voltage pin LX. The overvoltage protection signal OVP is generated by detecting the output voltage $V_{OUT}$, a feedback signal FB is provided from the node between the backlight source 104 and a resistor $R_1$, and an input signal CE is to provide a chip enable signal or dimming control signal to adjust the brightness of the backlight source 104. Since only the backlight source 104 is controlled by the controller chip 100, the other one, i.e., the backlight source 108, is permanently lighted up, resulting in high power consumption thereof. Alternatively, as illustrated in FIG. 2, two controller chips 200 and 202 are used for controlling the backlight sources 208 and 210 of panels 204 and 206, respectively. Even the power consumption is reduced by using two controller chips 200 and 202 individually controlling the backlight sources 208 and 210, the cost is higher for two chips 200 and 202 are used.

As shown in FIGS. 1 and 2, the conventional backlight system of a dual panel display handheld apparatus requires two controller chips to fully control the two display panels thereof, otherwise one of them has to be left out of control. Moreover, the conventional backlight controller chip provides only positive voltage, and it is therefore not capable of applying to organic light-emitting diode (OLED) display panel. For the purpose of obviating aforementioned disadvantages, it is desired a single backlight power controller chip for full control of a dual panel display in a handheld apparatus, and for application to various types of dual panel display.

SUMMARY OF THE INVENTION

One object of the present invention is to provide a backlight power controller chip available for individually controlling the backlight sources of a dual panel display in a handheld apparatus.

Another object of the present invention is to provide a backlight power controller chip available for various types of displays with backlight sources to be controlled.

In a dual panel display backlight power controller chip for handheld apparatus, according to the present invention, a power source input is provided to be connected with an input voltage, a control circuit is connected to the power source input for generating a first and second control signals, a first switch controlled by the first control signal is connected between a first display panel and ground, a second switch controlled by the second control signal is connected between a second display panel and ground, and a panel selection input is connected to the control circuit for selection of the first and second switches to be turned on or off.

A voltage converter circuit is also provided in the backlight power controller chip for converting the input voltage to an output voltage on a voltage output pin to supply to the first or second display panel. The voltage converter circuit includes a boost voltage circuit or buck voltage converter. A charge pump circuit is further provided in conjunction with the backlight power controller chip for generating a negative voltage from the output voltage to supply the first or second display panel. A brightness adjustment input is additionally provided to connect to the control circuit for adjusting the brightness of the first or second display panel.

The backlight power controller chip of the present invention may be applied to various display panels, such as STN-LCD, TFT-LCD, white LED (WLED) display, active matrix OLED (AMOLED) display, passive matrix OLED (PMOLED) display, and so forth.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

FIRST EMBODIMENT

Figure 1:
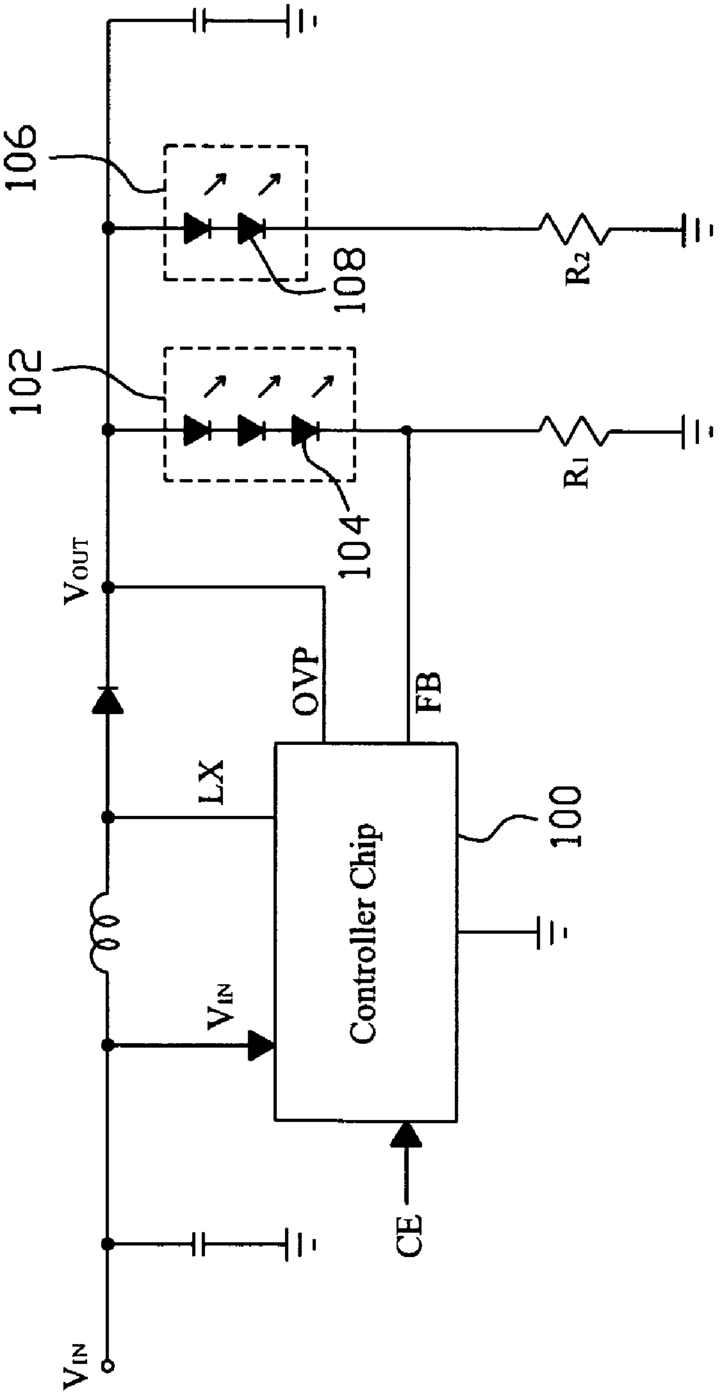
Fig. 1 (Prior Art)
FIG. 1 shows a systematic diagram of a conventional backlight system with single controller chip for dual panel display handheld apparatus.
Figure 2:
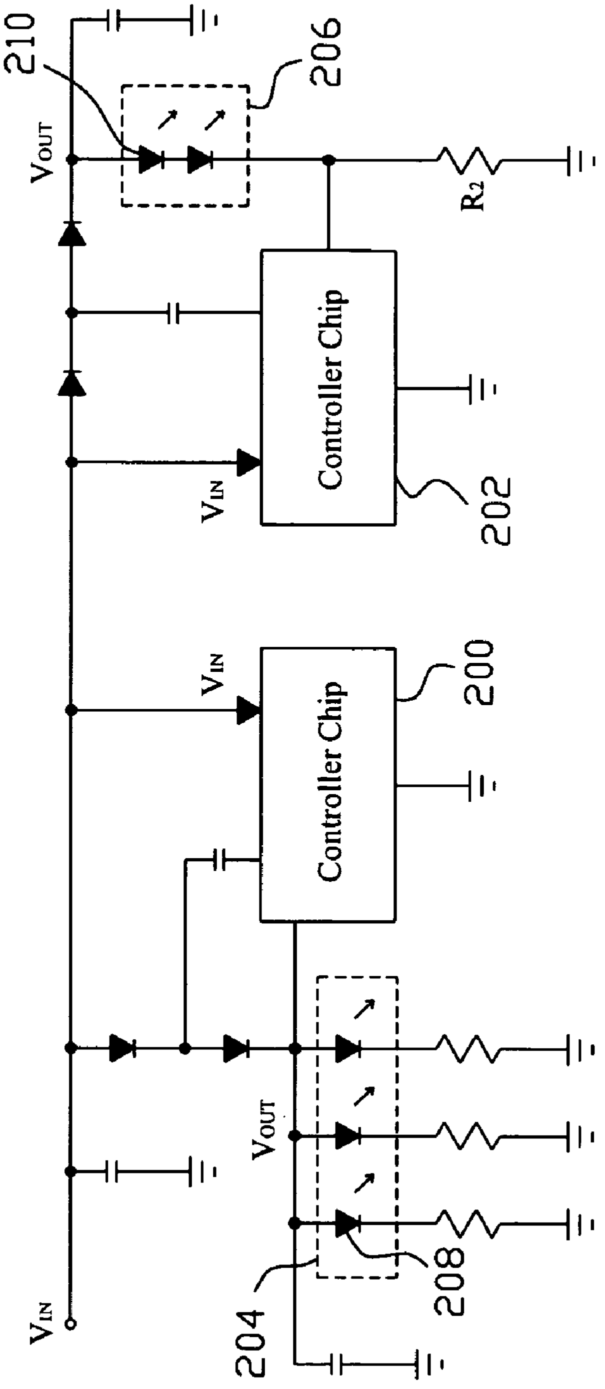
Fig. 2 (Prior Art)
FIG. 2 shows a systematic diagram of another conventional backlight system with two controller chips for dual panel display handheld apparatus.
Figure 3:
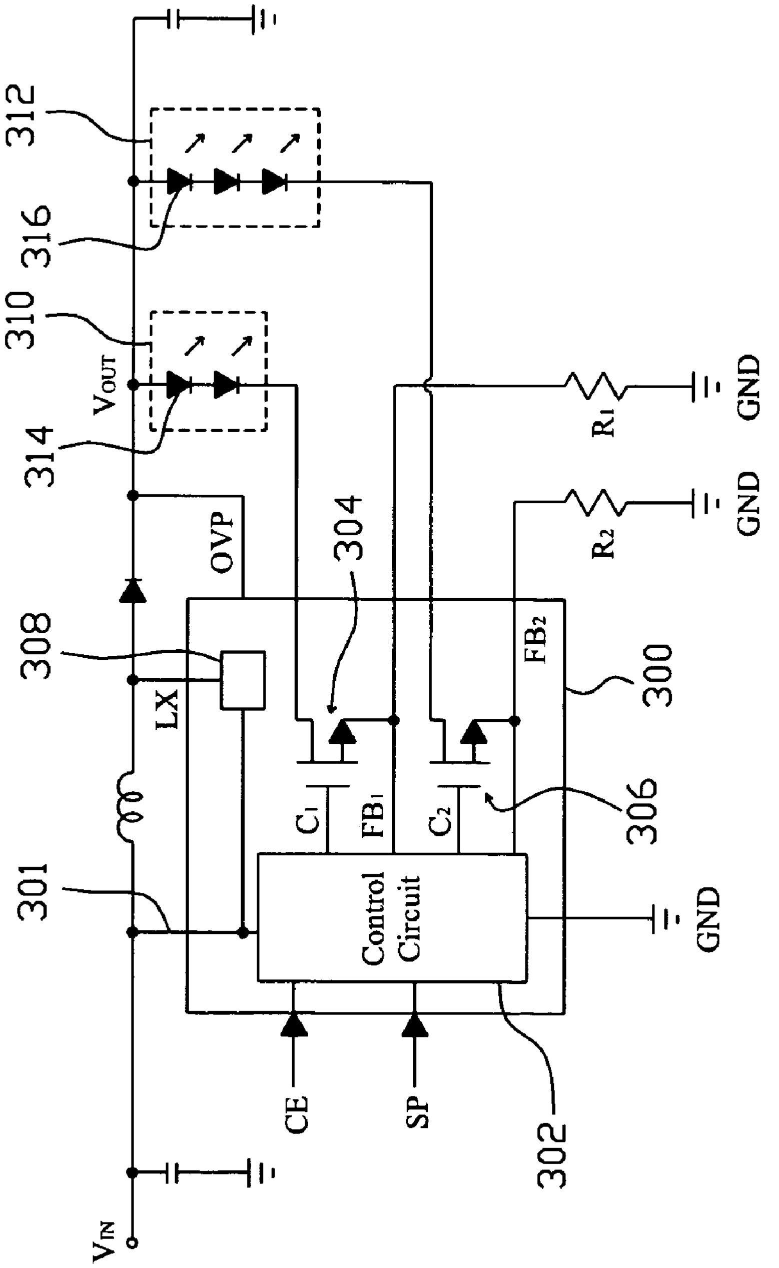
FIG. 3 shows a first embodiment of the present invention applied in a backlight system of a dual panel display handheld apparatus.

FIG. 3 shows a first embodiment of the present invention applied in a backlight system of a dual panel display handheld apparatus in a typical manner, in which a power controller chip 300 is used for power control of the backlight sources 314 and 316 of display panels 310 and 312. The controller chip 300 comprises a power source input 301 connected with an input voltage $V_{IN}$ from power supply, a control circuit 302 connected to the input voltage $V_{IN}$ to generate two control signals $C_1$ and $C_2$, two switches 304 and 306 switched by the control signals $C_1$ and $C_2$, respectively, a voltage converter circuit 308 including boost voltage circuit to convert the input voltage $V_{IN}$ to an output voltage $V_{OUT}$ through a voltage output pin LX to supply to the backlight sources 314 and 316, a panel selection input SP connected to the control circuit 302 for selection of the switches 304 and 306 to be turned on or off, and a brightness adjustment input CE connected to the control circuit 302 to adjust the brightness of the backlight sources 314 and 316. The switch 304 is connected between the panel 310 and a resistor $R_1$, and the switch 306 is connected-between the panel 312 and a resistor $R_2$. Both resistors $R_1$ and $R_2$ are grounded at one terminal, and preferably, the switches 304 and 306 are both NMOS transistors. When the input voltage $V_{IN}$ is applied to the controller chip 300, the output voltage $V_{OUT}$ is generated by the voltage converter circuit 308 to supply to the backlight sources 314 and 316 of the display panels 310 and 312 through the voltage output pin LX. The voltage converter circuit 308 may also include buck voltage circuit as desired. However, the voltage converter circuit 308 is a prior art, and is not illustrated in detail hereof. Meanwhile, the controller chip 300 may generate an overvoltage protection signal OVP by detecting the output voltage $V_{OUT}$, as a conventional controller chip does. When the switch 304 is turned on, the backlight source 314 is lighted up, and a feedback signal $FB_1$, generated from the node between the switch 304 and resistor $R_1$, is provided for the control circuit 302. Likewise, when the switch 306 is turned on, the backlight source 316 is lighted up, and a feedback signal $FB_2$, generated from the node between the switch 306 and resistor $R_2$, is provided for the control circuit 302. By this manner, the use of the panel selection input SP selects the switches 304 and 306 to be turned on or off, thereby determining the display panels 310 and 312 on or off. The controller chip 300 may control the output voltage $V_{OUT}$ in accordance with the signals OVP, $FB_1$ and $FB_2$, and prevents damages to the backlight sources 314 and 316 resulted from overvoltage.

SECOND EMBODIMENT

Figure 4:
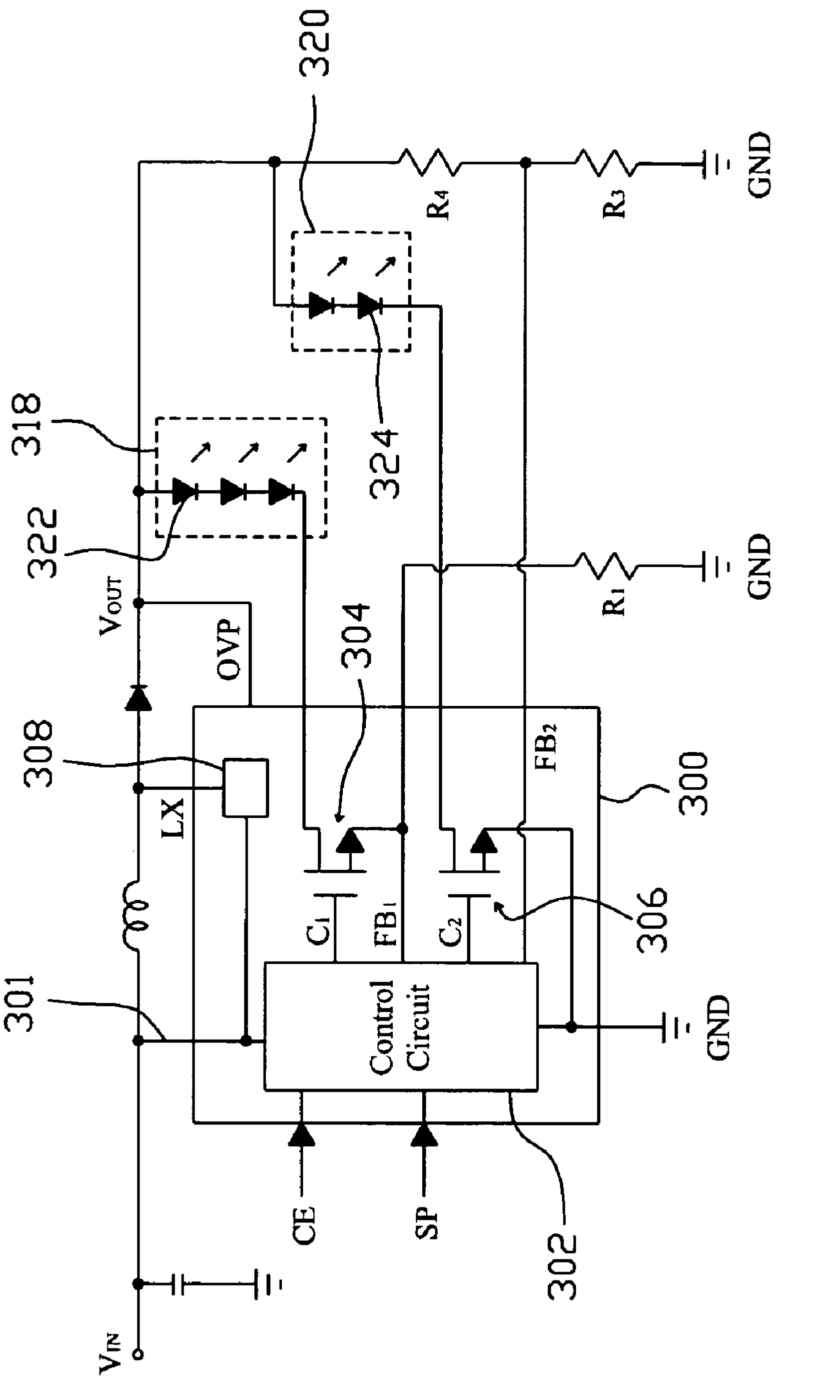
FIG. 4 shows a second embodiment of the present invention applied in a backlight system of a dual panel display handheld apparatus.

FIG. 4 shows another embodiment of the present invention applied in a backlight system of a dual panel display handheld apparatus. The controller chip 300 is used to control the backlight sources 322 and 324 of a TFT-LCD panel 318 and a PMOLED panel 320, respectively. The controller chip 300 is similar to that one shown in FIG. 3. However, the light system hereof is so configured that the switch 304 is connected between the panel 318 and resistor $R_1$, the switch 306 is connected between the panel 320 and ground GND, and two resistors $R_3$ and $R_4$ are connected in series between the output voltage $V_{OUT}$ and ground GND to generate a feedback signal $FB_2$ from the node between the resistors $R_3$ and $R_4$ to provide for the control circuit 302. When the switch 304 is turned on, a feedback signal $FB_1$, generated from the node between the switch 304 and resistor $R_1$, is provided for the control circuit 302. As same as that shown in FIG. 3, there are two channels to fully control the TFT-LCD panel 318 and PMOLED panel 320 on and off. The voltage converter circuit 308 includes boost voltage circuit or buck voltage circuit, and the inputs SP and CE are used for panel selection and brightness adjustment, as they do in the circuit of FIG. 3. Similarly, the controller chip 300 may control the output voltage $V_{OUT}$ in accordance with the signals OVP, $FB_1$ and $FB_2$, and prevents overvoltage damages to the backlight sources 322 and 324.

THIRD EMBODIMENT

Figure 5:
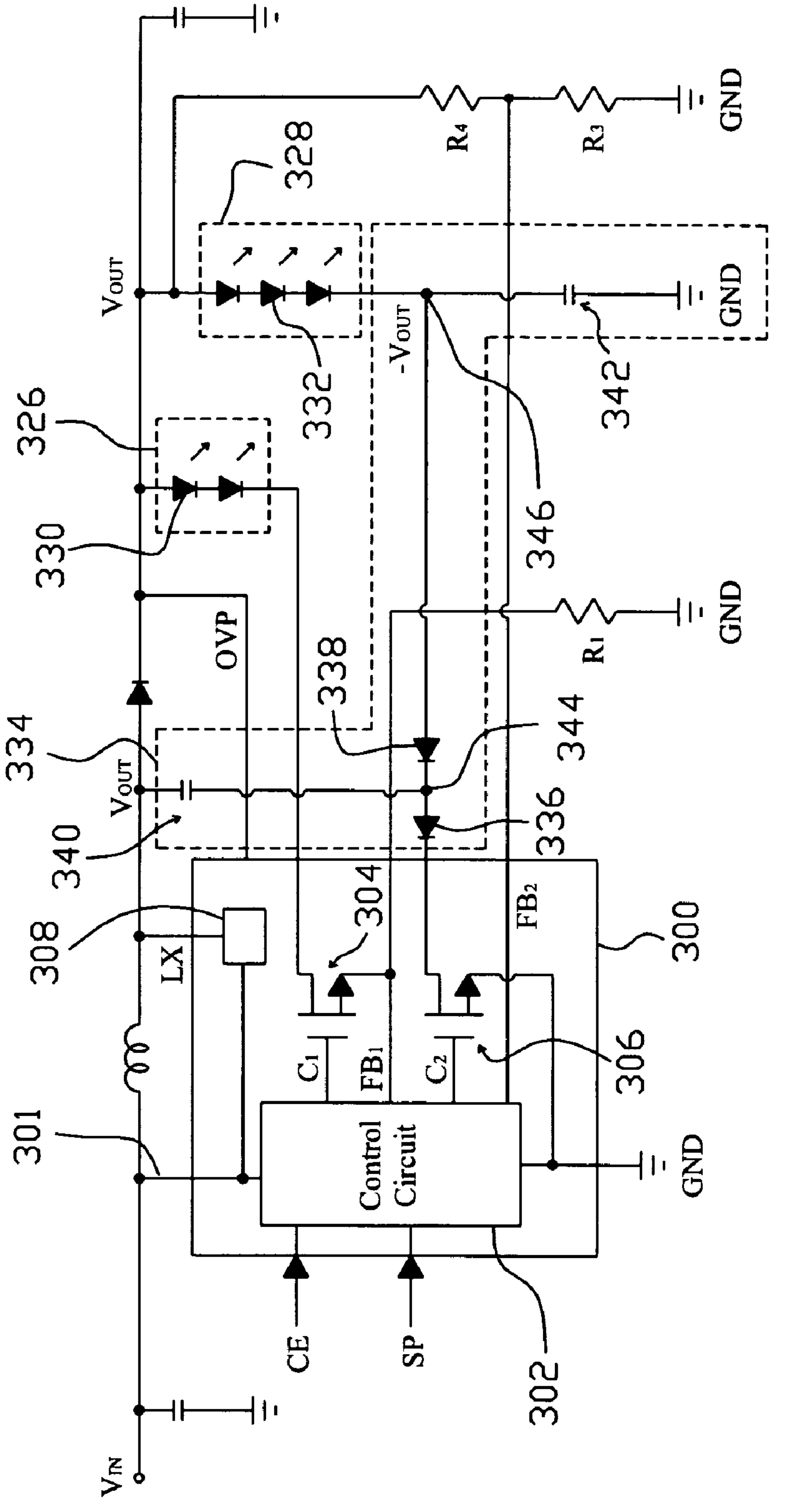
FIG. 5 shows a third embodiment of the present invention applied in a backlight system of a dual panel display handheld apparatus.

FIG. 5 shows a further embodiment of the present invention applied in a backlight system of a dual panel display handheld apparatus. The controller chip 300 is the same as that shown in FIG. 4, and is used hereof to control the backlight sources 330 and 332 of an STN-LCD panel 326 and an AMOLED panel 328, respectively. However, this light system is so configured that the switch 304 is connected between the panel 326 and resistor $R_1$, the switch 306 is connected between the panel 328 and ground GND, two resistors $R_3$ and $R_4$ are connected in series between the output voltage $V_{OUT}$ and ground GND to generate a feedback signal $FB_2$ from the node between the resistors $R_3$ and $R_4$ to provide for the control circuit 302, and for the backlight source 332 of the AMOLED panel 328 requires positive and negative voltages to drive thereto, a charge pump circuit 334 is introduced hereof in the manner that, to provide a negative voltage $-V_{OUT}$ on the node 346 for the backlight source 332 of the AMOLED panel 328. Between the output voltage $V_{OUT}$ and ground GND, the charge pump circuit 334 includes two capacitors 340 and 342 connected in series with a diode 338 inserted therebetween by the nodes 344 and 346, and a second diode 336 inserted between the first diode 338 and the switch 306. For the AMOLED panel 328, the charge pump circuit 334 generates the negative voltage $-V_{OUT}$ on the capacitor 346. Therefore, the circuit hereof also provides two channels to fully control the STN-LCD panel 326 and AMOLED panel 328 on and off. Alternatively, the charge pump circuit 334 may be also integrated in the chip 300. When the switch 304 is turned on, a feedback signal $FB_1$, generated from the node between the switch 304 and resistor $R_1$, is provided for the control circuit 302. Similarly, the controller chip 300 may control the output voltage $V_{OUT}$ in accordance with the signals OVP, $FB_1$, and $FB_2$, and prevents overvoltage damages to the backlight sources 330 and 332.

From the above embodiments, it is also shown that a backlight system with the application of the controller chip according to the present invention may provide various voltages for the panel under its control, and thus the controller chip is applicable to various types of panels, in addition to only one controller chip required to control two panels individually.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A dual panel display backlight power controller chip for handheld apparatus, comprising:

a power source input for being connected with an input voltage;

a control circuit connected to said power source input for generating a first and second control signals;

a first switch for being connected between a first display panel and a ground to be switched on and off by said first control signal;

a second switch for being connected between said second display panel and ground to be switched on and off by said second control signal; and a panel selection input connected to said control circuit for selection of said first and-second switches to be turned on and off.

2. The chip according to claim 1, further comprising a voltage converter circuit for converting said input voltage to an output voltage on a voltage output pin to supply to said first or second display panel.

3. The chip according to claim 2, wherein said voltage converter circuit includes a boost voltage circuit.

4. The chip according to claim 2, wherein said voltage converter circuit includes a buck voltage circuit.

5. The chip according to claim 1, further comprising a brightness adjustment input connected to said control circuit for adjusting a brightness of said first or second display panel.

6. The chip according to claim 1, further comprising a charge pump circuit connected with said output voltage for generating a negative voltage from said output voltage to supply to said first or second display panel.

7. A light source system of a dual panel handheld apparatus, comprising:

a power source input for being connected with an input voltage;

a voltage converter circuit for converting said input voltage to an output voltage;

a first display panel connected to said output voltage;

a second display panel connected to said output voltage;

a control circuit connected to said power source input for generating a first and second control signals;

a first switch connected between said first display panel and a ground for being switched on and off by said first control signal;

a second switch connected between said second display panel and ground for being switched on and off by said second control signal; and a panel selection input connected to said control circuit for selection of said first and second switches to be turned on and off;

wherein a first feedback signal is provided from a first node between said first switch and ground, a second feedback signal is provided from a second node between said second switch and ground, and said control circuit controls said output voltage in accordance with said first or second feedback signal.

8. The system according to claim 7, further comprising a brightness adjustment input connected to said control circuit for adjusting a brightness of said first or second display panel.

9. The system according to claim 7, wherein said voltage converter circuit includes a boost voltage circuit.

10. The system according to claim 7, wherein said voltage converter circuit includes a buck voltage circuit.

11. A light source system of a dual panel handheld apparatus, comprising:

a power source input for being connected with an input voltage;

a voltage converter circuit for converting said input voltage to an output voltage;

a first display panel connected to said output voltage;

a second display panel connected to said output voltage;

a control circuit connected to said power source input for generating a first and second control signals;

a first switch connected between said first display panel and a ground for being switched on and off by said first control signal;

a second switch connected between said second display panel and ground for being switched on and off by said second control signal; and a panel selection input connected to said control circuit for selection of said first and second switches to be turned on and off;

wherein a first feedback signal is provided from a node between said first switch and ground, a second feedback signal is generated from said output voltage by a voltage divider, and said control circuit controls said output voltage in accordance with said first or second feedback signal.

12. The system according to claim 11, further comprising a brightness adjustment input connected to said control circuit for adjusting a brightness of said first or second display panel.

13. The system according to claim 11, wherein said voltage converter circuit includes a boost voltage circuit.

14. The system according to claim 11, wherein said voltage converter circuit includes a buck voltage circuit.

15. A light source system of a dual panel handheld apparatus, comprising:

a power source input for being connected with an input voltage;

a voltage converter circuit for converting said input voltage to an output voltage;

a first display panel connected to said output voltage;

a second display panel connected to said output voltage;

a control circuit connected to said power source input for generating a first and second control signals;

a charge pump circuit connected with said output voltage for converting said output voltage to a negative voltage supplied to said second display panel;

a first switch connected between said first display panel and a ground for being switched on and off by said first control signal;

a second switch connected between said second display panel and ground for being switched on and off by said second control signal; and a panel selection input connected to said control circuit for selection of said first and second switches to be turned on and off;

wherein a first feedback signal is provided from a node between said first switch and ground, a second feedback signal is generated from said output voltage by a voltage divider, and said control circuit controls said output voltage in accordance with said first or second feedback signal.

16. The system according to claim 15, further comprising a brightness adjustment input connected to said control circuit for adjusting a brightness of said first or second display panel.

17. The system according to claim 15, wherein said voltage converter circuit includes a boost voltage circuit.

18. The system according to claim 15, wherein said voltage converter circuit includes a buck voltage circuit.

* * * * *